US008380582B2

(12) United States Patent
Juda et al.

(10) Patent No.: US 8,380,582 B2
(45) Date of Patent: Feb. 19, 2013

(54) ANNOTATING CONTENT (75) Inventors: Adam Isaac Juda, New York, NY (US); Ayan K. Mandal, New York, NY (US)

(73) Assignee: Google Inc., Mountain View, CA (US)

( * ) Notice: Subject to any disclaimer, the term of this patent is extended or adjusted under 35 U.S.C. 154(b) by 498 days.

(21) Appl. No.: 12/540,170

(22) Filed: Aug. 12, 2009

(65) Prior Publication Data

US 2011/0040644 A1 Feb. 17, 2011

(51) Int. Cl.
G06Q 30/00 (2012.01)
(52) U.S. Cl. ......... 705/26.3; 705/1; 705/26.1; 705/36 R; 705/37; 705/27.1
(58) Field of Classification Search ............ 705/26.1, 705/26.3, 14.27, 37, 34; 715/748
See application file for complete search history.

(56) References Cited

U.S. PATENT DOCUMENTS

| 6,691,069 | B1* | 2/2004 | Mandin et al. ............ 702/187 |
| 7,983,959 | B2* | 7/2011 | Chickering et al. ......... 705/26.3 |
| 2004/0138946 | A1 | 7/2004 | Stolze |
| 2004/0254798 | A1* | 12/2004 | Hoang ........................ 705/1 |
| 2005/0256867 | A1 | 11/2005 | Walther et al. |
| 2007/0130124 | A1 | 6/2007 | Ramsey et al. |
| 2007/0250901 | A1 | 10/2007 | McIntire et al. |
| 2008/0052219 | A1* | 2/2008 | Sandholm et al. ........... 705/37 |
| 2008/0163071 | A1* | 7/2008 | Abbott et al. ............... 715/748 |
| 2008/0189634 | A1* | 8/2008 | Tevanian et al. ............ 715/764 |
| 2009/0204485 | A1* | 8/2009 | Wills et al. .................. 705/14 |
| 2010/0100504 | A1* | 4/2010 | Highland et al. ........... 705/36 R |

OTHER PUBLICATIONS

International Search Report dated Apr. 28, 2011 (8 pages).
Authorized officer Philippe Becamel, International Preliminary Report on Patentability in PCT/US2010/045193 mailed Feb. 23, 2012, 5 pages.
Authorized officer Philippe Becamel, International Preliminary Report on Patentability in PCT/US2010/045193 mailed Feb. 23, 2012, 4 pages.

* cited by examiner

Primary Examiner — Yogesh C Garg
(74) Attorney, Agent, or Firm — Fish & Richardson P.C.

(57) ABSTRACT

Content can be annotated with indications that contextually-related content associated with the annotation is available to a user in order to allow a user to more easily locate and access contextually-related content, particularly where hypertext links are unsuitable, such as for graphic and/or audio content. The location of the annotation within the content can indicate the portion of the content to which the contextually-related content pertains, and can be associated with a summary of the contextually-related content, such as a summary of the content, a brief explanation of the relatedness of the related content, and/or an indication of the source or the contextually-related content.

23 Claims, 4 Drawing Sheets

ANNOTATING CONTENT

TECHNICAL FIELD

This disclosure relates to annotating content.

BACKGROUND

Computer networks, such as the Internet, are commonly used for dissemination of information by different types of users. For example, some individuals use the Internet for distribution of educational information, such as instructional materials or reference materials. Other users publish, for example, financial or commercial information for use in researching and/or purchasing goods, services, or investments. The interconnected nature of the Internet is useful for allowing a user to find additional content that is contextually related to content that is currently provided to the user. In text-based content displays, hypertext links can be used to provide a user with a mechanism for navigating to related content.

SUMMARY

In one general aspect, annotating a display includes receiving a bid to annotate a display, the bid including information about how the display is to be annotated, and price information, storing the bid to annotate the display, receiving a request to view the display, providing, in response to the request to view the display, an annotated version of the display that is annotated according to the information included in the bid, and charging the price to a user associated with the bid.

Implementations may include one or more of the following features. For example, the bid identifies the display to be annotated, and the information about how the display is to be annotated includes an image to add to the display, a location at which to add an image to the display, content associated with the annotation, identification information of an entity providing the bid, and/or payment information for annotating the display as requested. The content associated with the annotation includes an advertisement provided by the entity providing the bid. Annotating the display also includes collecting a fee for providing the annotated version of the display. Annotating the display also includes selecting, in response to the request to view the display, at least one bid to annotate the display, wherein the annotated version of the display is annotated according to the information included in each selected bid. The display is a graphical display, and the information about how the display is to be annotated includes information regarding an image to add to the graphical display and a location at which to add the image to the graphical display. The information about how the display is to be annotated includes an address of a web page including information selected, by an entity providing the bid, as being relevant to the location of the display. Selecting at least one bid includes using an auction. A price charged to an entity providing the selected bid is based on a bid price associated with a non-selected bid. The auction is a second price auction. The at least one bid is selected based at least in part on performance information associated with the at least one bid. The performance information includes a click-through rate. The annotated version of the display includes a link located at a location of the display identified by the information about how the display is to be annotated. The link includes a link to content identified by the information about how the display is to be annotated. Annotating the display also includes receiving, in response to an activation of the link, an indication that the link was activated. Storing the bid comprises updating an index of bids. Annotating the display also includes obtaining the content from a content repository and annotating the content, and providing an annotated version of the display includes providing the annotated content. The information about how to annotate the display includes information of a date and time, and the information of a date and time is sufficient to determine a location on the display at which the display is to be annotated. The display comprises a graph of a value over time.

In another general aspect, providing sponsored annotations includes building an index of bids provided by advertisers, each bid including information identifying content to be annotated, information about how to annotate the content, and information identifying secondary content to be associated with the annotation of the content, selecting at least one bid from the index, annotating the content identified by the information of the bid according to the information included in the bid, and transmitting the annotated content for display.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
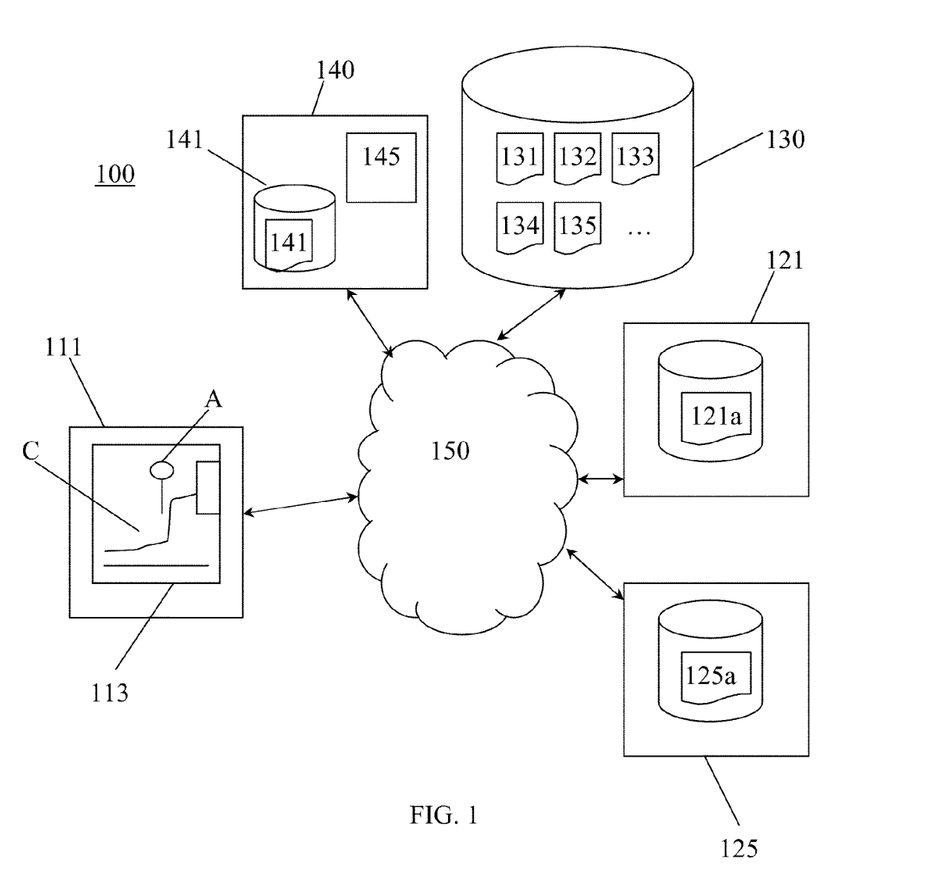
FIG. 1 is a diagram of an example system for annotating content.
Figure 2:
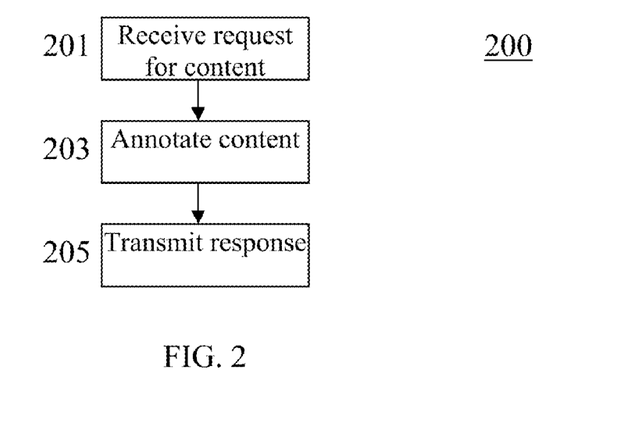
FIGS. 2 and 3 are flowcharts illustrating example processes for annotating content.

With reference to FIGS. 1 and 2, a system 100 employs a process 200 to annotate content. The system 100 includes a user terminal 111 that is operable to retrieve and display content, such as content provided by a publisher 130. The user terminal 111 communicates with the publisher 130 through a computer network 150, such as the Internet, using a computer application, such as an Internet browser 113 loaded on the user terminal 111. This permits the publisher 130 to provide content in the form of web pages 131-135 that provide instructions usable by the Internet browser 113 of the user terminal 111 to display the content (designated as "C" in FIG. 1) associated with a selected web page in a display area of a graphical user interface provided by the Internet browser 113.

Figure 5:
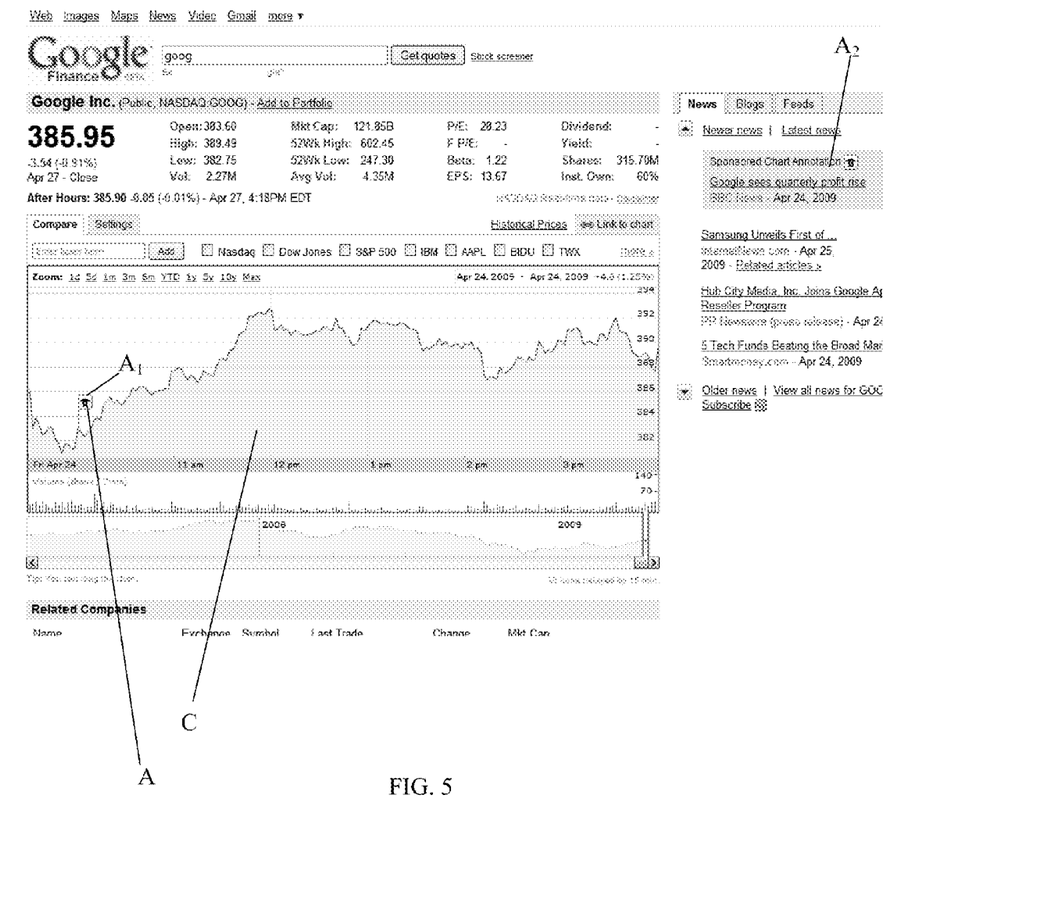
FIG. 5 is an illustration of an example computer display of annotated content.

The content C can include an annotation A located at a predetermined location within the display of the content C. The predetermined location corresponds to a portion of the content C to which the annotation pertains. For example, as illustrated in FIG. 5, the content C can be a graph of a price of a selected stock and the annotation A can be located at a portion of the graph closely preceding a change in the stock price. Thus, the annotation A can pertain to the release of a news story that is a perceived cause of the change in the stock price, an indication that a stock brokerage changed its recommendation on the stock, or other information deemed to pertain to the predetermined location of the annotation A.

The system 100 additionally includes suppliers 121 and 125 who provide annotations, and distributor 140 that facilitates inclusion of annotations in selected content. The publisher 130 arranges for annotation of the content C of the web page 132 and one or more of the suppliers 121 and 125 provides one or more annotations for the content C. When the distributor 140 receives (201) an annotation request, the distributor 140 annotates (203) the content C of the web page 132 of the publisher 130 by including the annotation A. The distributor 140 then transmits a response to the request for the web page 132 by transmitting the annotated content C including the annotation A.

In some implementations, the provider 125 can be an advertiser that sponsors the placement of annotations and the distributor 140 can facilitate placement of the annotations, including accounting for charges associated with placing the annotations. For example, with reference to FIG. 3, the provider 125 selects (301) the content C for which the provider 125 desires to provide an annotation A. The provider 125 also selects (303) additional information that is associated with the annotation A. The additional information can include an icon or other graphic display that is associated with the annotation, a location relative to the content C for display of the icon, and information that is determined by the provider 125 to relate to the selected location of the content C. The information that relates to the selected location can take the form of a web page 125a on which the information is displayed. The provider 125 selects (305) a price that the provider 125 is willing to pay to have the annotation A included with the content C. The price can include two or more components, such as a first price for displaying the icon at the location, and a second price for displaying the web page 125a. The provider 125 then transmits (307) this information to the distributor 140 in the form of a bid. Upon receiving (309) the bid, the distributor 140 updates (311) annotation information 141 a stored in a repository of bids 141.

Figure 3:
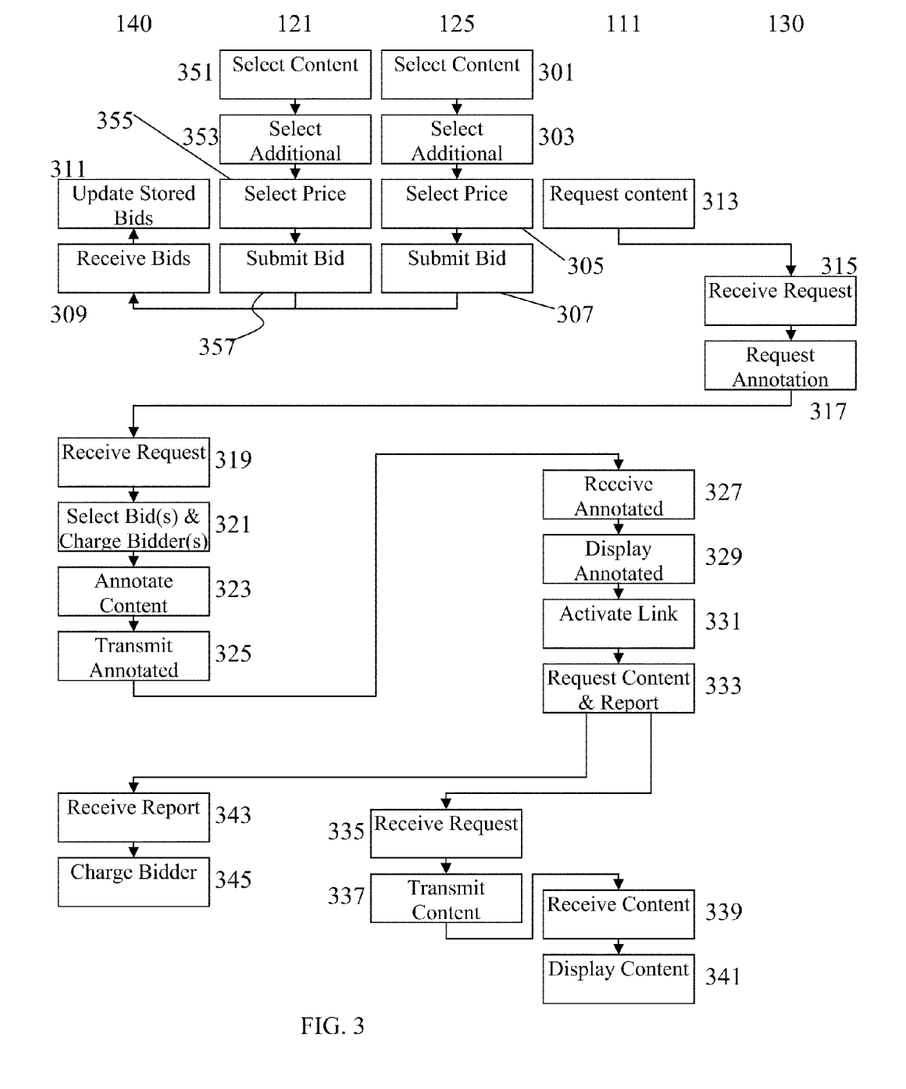

Similarly, the provider 121 selects (351) the same or different content C for which the provider 121 desires to provide an annotation A. The provider 121 also selects (353) additional information that is associated with the annotation A. The additional information can include an icon or other graphic display that is associated with the annotation, a location relative to the content C for display of the icon, and information that is determined by the provider 121 to relate to the selected location of the content C. If the provider 121 selects the same content C for annotation as selected by the provider 125, the selected location can be a different location, or the same location. The information that relates to the selected location can take the form of a web page 121 a on which the information is displayed, and can also be the same as or different than the information selected by the provider 125. The provider 121 selects (355) a price that the provider 121 is willing to pay to have the annotation A included with the content C. The price can include two or more components, such as a first price for displaying the icon at the location, and a second price for displaying the web page 121a. The provider 121 then transmits (357) this information to the distributor 140 in the form of a bid. Upon receiving (309) the bid, the distributor 140 updates (311) annotation information 141a stored in a repository of bids 141.

When a user navigates to a web page 132 of the publisher 130, the user terminal 111 transmits a content request to the publisher 130 (313). When the publisher 130 receives the request (315), the publisher 130 transmits a request for annotation of the content C to the provider 140 (317). When the distributor 140 receives the request for annotation (319), the distributor 140 selects an annotation and charges an associated provider 125 (321) if the provider 125 has indicated price information. The distributor 140 includes selection engine 145 for selecting an annotation in response to a request. In a simple example, the request for annotation of the content C includes web page 132 that includes the content C. The selection engine 145 can select an annotation by identifying all the annotations that are associated with the content C of the web page 132. The selection engine 145 can then select each of the identified annotations and annotate the content C by adding icons associated with the annotations at locations identified by the providers of the annotations (323).

In other implementations, however, the web page 132 can be transmitted to the user terminal 111 for display, and the web page 132 can include a redirect, or other instructions operable to cause the user terminal 111 to request annotation of the content C. Similarly, the content C can be transmitted with the web page 132, or by a redirect to a content server that serves the content C included in the web page 132. When the content server is not associated with the distributor 140, the annotation can be accomplished by transmitting the icons or other graphic displays associated with the selected annotation bids, and the user terminal 111 can annotate the content C by adding the icons or other graphic displays at their respective selected locations.

In some implementations, all the annotations are sponsored by the providers, and selection of the annotations can be competitive. For example, a first bid submitted by a first provider 121 identifies a location of the content C where a first icon is to be displayed, and price information for displaying the first icon at the location. The first icon is formed as a link to a first web page 121a associated with the first provider 121. Additionally, a second bid submitted by a second provider 125 identifies the same location of the content C where a second icon is to be displayed, and price information for displaying the second icon at the location. The second icon is formed as a link to a second web page 125a. In this example, the selection engine 145 cannot select both the first bid and the second bid because there is a conflict with respect to the location. Thus, the selection engine 145 must perform a conflict resolution to select one of the first bid and the second bid. The selection engine 145 can resolve the conflict, for example, by simply selecting the bid with the higher price for displaying the associated icon. Additional factors can affect the conflict resolution, such as additional price components of the bids, including a discount factor based on a historical or predicted rate of receiving the additional price, an annotation selection history, and/or preference information.

For example, the additional price components of the bid can be a price paid by an associated provider when a user activates a link associated with the icon and navigates to the selected web page. This price can be discounted by multiplying the additional price by the historical rate of activation of the link, or by multiplying the additional price by a predicted rate of activation of the link, such as a historical or predicted click-through rate. Additionally or alternatively, the conflict can be resolved based on which of the two bids has been selected more frequently in the past, and the selection can be made to equalize the frequency of selection of the bids. Additionally or alternatively, the preference information may relate to a preference of the publisher 130, such as a selection of a preferred provider included in the request for annotation, or previously-provided by the publisher 130. Furthermore, the preference information can relate to a preference of the user who requested the web page 132. For example, an indication that the user prefers one of the providers, or goods and services of one of the providers, can be provided in the request for content, such as through user-entry. Additionally, the user preference information can be determined by reference to a repository of user preference information that is generated based on a prior selection by the user or a statistical analysis of historical usage information.

Such a conflict may also arise in other situations. For example, a conflict may arise when one or more of the bids associated with the content C of the requested web page 132 includes a requirement of exclusivity. The requirement for exclusivity can signify that no other annotations may be selected, or that no annotations from other providers can be selected. If one of the bids requires absolute exclusivity, the selection engine 145 can select only that one bid including the absolute exclusivity requirement, or multiple other bids that permit selection of additional annotations. Thus a price of each bid that requires exclusivity can be compared to a price of each other bid requiring exclusivity, and to the sum of the prices of bids that do not require exclusivity, and for which no other conflict exists.

For example, if three bids have been made to annotate three different locations of the same content, one of the bids includes a requirement for exclusivity, and the other two bids do not include restrictions, the selection engine 145 can compare the price of the exclusive bid to the sum of the prices of the other two bids. As will be understood, other restrictions on selection can be imposed in the bids as desired by the providers 121 and 125, as desired by the publisher 130, and/or as permitted by the distributor 140. For example, each provider can select different restrictions based on the identity of another provider whose annotation is selected. Thus, a provider can permit selection of a bid along with bids of partner providers, and can forbid selection of the bid along with bids of competitors, or selected competitors. Additionally, a publisher can limit the total number of annotations allowed for the content C, and/or the publisher can limit the number of annotations allowed from the same provider. All of this information, including the bids, the selection policy of the distributor 140, and the conditions of the publisher 130 are dynamically adjustable such that each may be altered at any time through use of an interface of the distributor 140.

When the selection is completed and the content C has been annotated, the distributor 140 transmits the annotated content C, including any selected annotations, to the user terminal 111 (325). When the user terminal 111 receives the annotated content C (327), the user terminal displays the annotated content C to the user (329). In some implementations, the content and/or the annotation can include text, graphic elements, and/or sounds. For example, the content C can be a graph, a picture, a song, an animation, or other video and/or audio output, and the user terminal 111 can provide such output to the user based on the annotated content received from the distributor 140. In some implementations, the annotation can include multiple components. For example, and with reference to FIG. 5, the annotation can include a first component that is the icon $A_1$ located at a first predetermined location within the content C. Additionally, the annotation can include a second component that is the summary $A_2$ of the additional information of the associated web page that is related to the location of the icon $A_1$. The summary $A_2$ of the additional information can be displayed in a space within the web page 132 reserved for such summaries, such as a side bar. Additionally, the annotated content C can be configured to hide the summary $A_2$ until the user activates the annotation, such as by positioning a cursor over the icon $A_1$ or by clicking on the icon $A_1$. The summary $A_2$ can also be formed as a link to the website containing the additional information.

If the user wishes to view the additional information, the user can activate a link to the additional information (331), such as a link associated with the icon or a link associated with the summary. The user terminal 111 then transmits a request for the additional information to the provider 125, such as a request for a web page, and transmits a report to the distributor 140 indicating that the link to the additional information was activated (333). When the provider 125 receives the request for the additional information (335), the provider 125 transmits the additional information to the user terminal 111 (337). When the user terminal 111 receives the additional information (339), the user terminal displays the additional content to the user (341).

When the distributor 140 receives the report (343), the distributor 140 can update distribution information for the annotation, such as by updating a file in the repository 141. Thus, the distribution information can include indications of instances where the link was followed by a user to access the additional content. As discussed above, this information can be used in making subsequent selections of annotations. Additionally, the indication that the link was followed can be used as a basis for charging the provider 125 an amount equal to the price specified in the bid selected by the provider as a price for displaying the additional information (345).

In one example of use, the distributor 140 and the publisher 130 are controlled by a publisher of financial information. Particularly, the publisher publishes web pages including graphs of stock prices over time. The publisher can make web pages associated with different stocks available for sponsored annotation, and can generate rules and policies regarding the conditions of the annotation. Advertisers who wish to sponsor annotations on the graphs can submit bids to a distributor system of the publisher for inclusion in the web pages requested by customers of the publisher.

The bids can include a price for displaying an icon on the graph, information about the desired icon, identification information usable by the publisher to identify the advertiser, a location within the content to display the annotation, a summary of the annotation, and a link to a web page containing additional information about the selected stock and the selected location on the graph. For example, the advertiser can specify a maximum price that the advertiser is willing to pay to have the annotation selected and to have the icon displayed. The advertiser can also specify additional maximum prices to display the summary, and to display the web page associated with the link. Additionally, the advertiser can specify a price that the advertiser is willing to pay if a user purchases goods or services after viewing the summary or following the link. The advertiser can specify the icon by including a graphic file in the bid, and the location can be specified by providing a specific date and time. Thus, when annotating the graph, the publisher can simply add the graphic file at a location of the graph associated with the specified time, such that the icon will be displayed at the selected location regardless of the scale of the graph (e.g., whether the graph shows a daily stock price, or the stock price over the last five years. The link can be operable to direct a user to a web page controlled by the advertiser on which some information is provided that the advertiser believes is relevant to the selected time.

Figure 4:
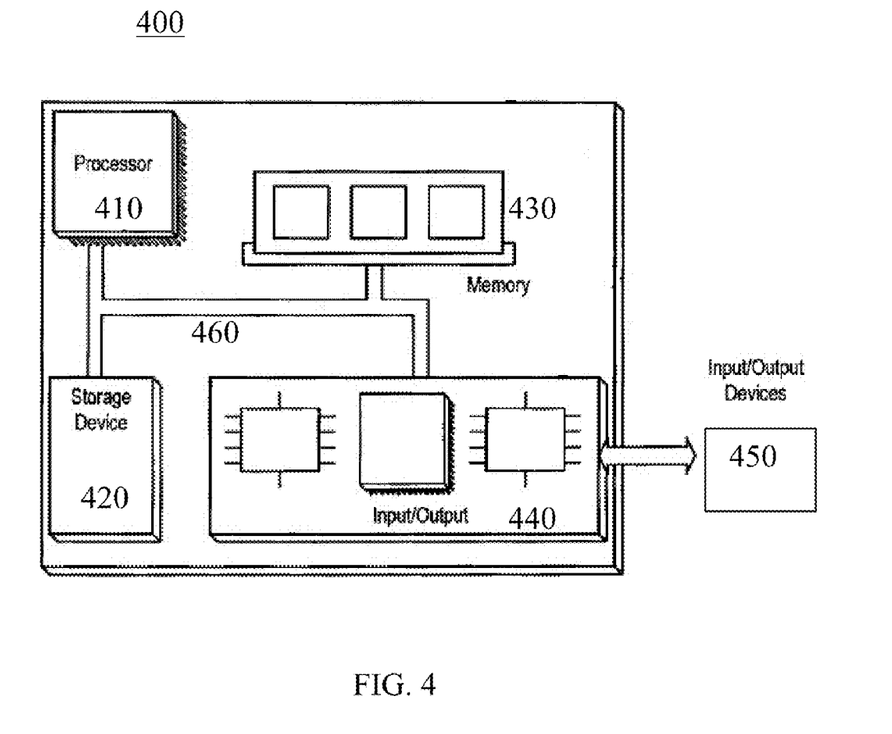
FIG. 4 is a diagram of an example computer system.

In some implementations, each of the user terminal 111, the providers 121 and 125, the publisher 130, and the distributor 140 can be formed as a computer system, such as the computer system 400 illustrated in FIG. 4. Particularly, the computer system 400 includes a processor 410, a storage device 420, a memory module 430, an input/output module 440, input/output devices 450, and a system bus 460. The storage device 420 can be a non-volatile storage device, such as an optical or magnetic drive, and can include computer software stored thereon and configured to perform the processes described above when executed by the processor 410.

The memory module 430 can be a volatile storage device, such as a random access memory (RAM) module. The input/output module 440 is operable to provide audio and/or video output to a user and to receive inputs from the user, such as from a keyboard, mouse, speakers, and/or monitor. The input/output module 440 can also include a modem or other communication device for transmitting and receiving information from other computer systems over the network 150. The computer system 400 can be formed as a personal desktop or laptop computer, a handheld device, such as a cell phone or personal digital assistant, a server computer, or other device, and each of the user terminal 111, the providers 121, 125, the publisher 130, and the distributor 140 can include one or more of these devices.

A number of implementations have been described. Nevertheless, it will be understood that various modifications may be made without departing from the spirit and scope of the claims. For example, various types of auctions can be used in selecting bids for annotations in order to control selection of winning bids, and to control prices charged. For example, the highest bidder in an auction can be selected as the winning bid, and the value of the second highest bid received can be charged. Alternatively, winning bids can be selected based on other criteria, including at random, and the bid price can be charged. Additionally, any type of visual or audio content format can be annotated, including maps, pictures, songs, and movies. Furthermore, an assessment of annotation quality and/or relevance can be used in place of, or in conjunction with price information in the selection process. Also, different restrictions on annotation can be imposed. Additionally, some or all of the processes described above, and alternative processes can be performed by different entities than as described above. Accordingly, other implementations are within the scope of the following claims.

What is claimed is:

1. A computer-implemented method comprising:
   receiving, by one or more computer systems, a bid to integrate an annotation into particular content, at a particular location within the particular content, the particular content being provided by a content publisher on a web page, the bid including information about how the annotation is to be integrated with the particular content, and price information;
   storing, by the one or more computer systems, the bid;
   receiving, from a device, a request to view the particular content;
   in response to the request to view the particular content, receiving, by the one or more computer systems, the annotation with instructions for integrating the annotation with the particular content;
   integrating, by the one or more computer systems, the annotation into the particular content at the particular location within the content;
   providing in response to the request to view the particular content, the particular content with the annotation integrated into the particular content at the particular location to the device; and
   charging the price to an entity associated with the bid.

2. The computer-implemented method of claim 1, wherein the information about how the annotation is to be integrated with the particular content comprises information selected from the group consisting of:
   an image to integrate into the particular content,
   additional content associated with the annotation,
   identification information of a second entity providing the bid, and
   payment information for annotating the particular content as requested.

3. The computer-implemented method of claim 2, wherein the additional content associated with the annotation includes an advertisement provided by the second entity providing the bid.

4. The computer-implemented method of claim 1, further comprising collecting a fee for providing the annotated version of the display.

5. The computer-implemented method of claim 1, further comprising selecting, in response to the request to view the particular content, at least one bid to integrate an annotation into the particular content, wherein the integrated version of the particular content is integrated according to the information included in each selected bid.

6. The computer-implemented method of claim 5, wherein selecting at least one bid comprises using an auction.

7. The computer-implemented method of claim 6, wherein a price charged to a second entity providing the selected bid is based on a bid price associated with a non-selected bid.

8. The computer implemented method of claim 6, wherein the auction is a second price auction.

9. The computer-implemented method of claim 5, wherein the at least one bid is selected based at least in part on performance information associated with the at least one bid.

10. The computer-implemented method of claim 9, wherein the performance information includes a click-through rate.

11. The computer-implemented method of claim 1, wherein the particular content is a graphical display, and wherein the information about how the annotation is to be integrated into the particular content comprises information regarding an image to insert into the graphical display and a location at which to insert the image into the graphical display.

12. The computer-implemented method of claim 11, wherein the information about how the annotation is to be integrated with the particular content comprises an address of a web page including information selected, by a second entity providing the bid, as being relevant to the location of the display.

13. The computer-implemented method of claim 1, wherein the particular content with the annotation integrated comprises a link located at a location of the particular content identified by the information about how the annotation is to be integrated with the particular content.

14. The computer-implemented method of claim 13, wherein the link comprises a link to additional content identified by the information about how the annotation is to be integrated with the particular content.

15. The computer-implemented method of claim 14, further comprising receiving, in response to an activation of the link, an indication that the link was activated.

16. The computer-implemented method of claim 1, wherein storing the bid comprises updating an index of bids.

17. The computer-implemented method of claim 1, wherein the information about how to integrate the annotation into the particular content comprises information of a date and time, and wherein the information of a date and time is sufficient to determine a location on the particular content at which the annotation is to be integrated into the particular content.

18. The computer-implemented method of claim 1, wherein the particular content comprises a graph of a value over time.

19. The method of claim 1, wherein the particular content comprises at least one of:

a graph;
a picture;
a song;
an animation;
a video; and
audio content.

20. The method of claim 1, further comprising receiving with the bid a requirement of exclusivity that requires the annotation be integrated into the particular content without additional annotations.

21. The method of claim 1, further comprising:
receiving a link to a landing page and a summary of the landing page, the link and the summary being provided by the user; and
displaying the summary upon user interaction with the annotation.

22. A computer-implemented method for providing sponsored integrated annotations comprising:
building, by one or more computer systems, an index of bids provided by advertisers, each bid identifying content and including (i) information identifying an annotation to integrate with the identified content, at a particular location within the identified content, the identified content being provided by a content publisher, (ii) information about how the annotation is to be integrated with the identified content, and (iii) information identifying secondary content to be associated with the annotation;
selecting, by the one or more computer systems, at least one bid from the index;
annotating, by the one or more computer systems and at the particular location within the identified content, the identified content according to the information included in the bid;
receiving a request to view the identified content on a device: and
in response to receiving the request to view the identified content, transmitting the annotated content for display to the device.

23. A computer-implemented method comprising:
receiving, by one or more computer systems, a bid to integrate an annotation into content, at a particular location within the content, the content provided by a content publisher on a web page, the bid including information about how the annotation is to be integrated with the content, and price information;
storing the bid;
receiving, from a device, a request to view the content;
in response to receiving the request to view the content, integrating, by the one or more computer systems, the annotation into the content, at the particular location within the content, the content being provided by the content publisher;
providing, to the device and in response to the request to view the content, the content with the integrated annotation; and
charging the price to an entity associated with the bid.

* * * * *

UNITED STATES PATENT AND TRADEMARK OFFICE
CERTIFICATE OF CORRECTION

PATENT NO. : 8,380,582 B2
APPLICATION NO. : 12/540170
DATED : February 19, 2013
INVENTOR(S) : Adam I. Juda and Ayan K. Mandal It is certified that error appears in the above-identified patent and that said Letters Patent is hereby corrected as shown below:

In the Claims:

Column 10, line 6, claim 22; replace:
"device: and" with
-- device; and --

Signed and Sealed this
Ninth Day of July, 2013

Teresa Stanek Rea
*Acting Director of the United States Patent and Trademark Office*